United States Patent [19]

Tsuchiya et al.

[11] 4,223,342
[45] Sep. 16, 1980

[54] CIRCUIT FOR IMPROVING THE FREQUENCY CHARACTERISTIC OF A COLOR TELEVISION SIGNAL

[75] Inventors: Takao Tsuchiya, Fujisawa; Takashi Okada, Yokohama; Yoshio Ishigaki, Tokyo; Shouji Omori, Tachikawa, all of Japan

[73] Assignee: Sony Corporation, Tokyo, Japan

[21] Appl. No.: 966,737

[22] Filed: Dec. 5, 1978

[30] Foreign Application Priority Data

Dec. 19, 1977 [JP] Japan .................. 52-152610

[51] Int. Cl.$^2$ ........................... H04N 5/14
[52] U.S. Cl. .......................... 358/37; 358/21
[58] Field of Search ................... 358/21, 37

[56] References Cited

U.S. PATENT DOCUMENTS 4,141,040 2/1979 Dischert et al. ................. 358/21

Primary Examiner—Richard Murray
Attorney, Agent, or Firm—Lewis H. Eslinger; Alvin Sinderbrand

[57] ABSTRACT

For improving the frequency characteristic of a color television signal, particularly one in which the chrominance component thereof is provided with a bandwidth substantially narrower than that of the luminance component, the luminance component is used to generate a control signal which is proportional to the lack of registration between low and high frequency portions of the luminance component spectrum, and the control signal thus obtained selectively increases and decreases a delay applied to the relatively narrow-bandwidth chrominance component to substantially align its excursions with the excursions of the relatively wide bandwidth luminance component.

10 Claims, 17 Drawing Figures

CIRCUIT FOR IMPROVING THE FREQUENCY CHARACTERISTIC OF A COLOR TELEVISION SIGNAL

BACKGROUND OF THE INVENTION

1. Field of the Invention

The present invention relates to a circuit for improving the frequency characteristic of a color television signal, and particularly of the chrominance component thereof.

2. Description of the Prior Art

The signal bandwidth of the chrominance component of a color television signal according to the NTSC system is 1.5 MHz and is narrower than the bandwidth of the luminance component which is about 4.0 MHz. Therefore, when the signal generated by a television camera is transmitted and demodulated in the receiver, the resulting color signals may not be reproduced in exact registration with the luminance component and blurring of the color image may result.

For purposes of illustration, if it is assumed that a received television signal represents the transition between a sharp-edged red primary color area and adjacent portions of a television picture, both the luminance component and the demodulated red color-difference signal should be step-shaped signals at such transition. However, due to the above noted limitation of the frequency band of the chrominance component, the desired step-shaped configuration of the color-difference signal is degraded to a more slowly rising or falling ramp signal. In contrast, the wider bandwidth of the luminance component permits a better approximation of the step-shaped configuration to be attained. Consequently, in a reproduced color television picture, there may be mis-registration of the color image with respect to the luminance image so that there is blurring or poor resolution of the color image.

OBJECTS AND SUMMARY OF THE INVENTION

Accordingly, it is an object of this invention to improve the frequency characteristics of a color television signal, and particularly of the chrominance component thereof when the latter is provided with a bandwidth substantially narrower than that of the luminance component.

Another object is to avoid mis-registration and resulting blurring of a reproduced color television picture due to differences in the bandwidths of the chrominance and luminance components of a color television signal.

In general, the chrominance and luminance components of a color television signal are related or undergo correlated excursions. As described in the preceding example, in signifying a sharp edged transition to an area of primary red, both the demodulated red color-difference signal and luminance component signal should exhibit step-shaped changes or excursions. The present invention maintains this correlation by deriving from the wide-bandwidth luminance component a control signal which is employed to artificially sharpen the demodulated color-difference signal and thereby gives to it a frequency characteristic which could otherwise only be achieved with a much wider bandwidth chrominance component.

More particularly, in accordance with an aspect of this invention, the luminance component is separated into low and high frequency portions, so that the low frequency portion of the luminance component may be employed as an analogue of the relatively narrow bandwidth chrominance component. The low frequency portion of the luminance component is differentiated and the resulting differentiated low frequency portion is divided into the high frequency portion. The resulting quotient or ratio constitutes a control signal corresponding to the extent by which the low frequency portion leads or lags the high frequency portion of the luminance component. This control signal is applied to a delay controller which, in effect, proportionately advances or retards the chrominance component by decreasing or increasing, respectively, a delay imparted thereto. Due to this selective advancement and retardation of the chrominance signal, a sloped leading edge, for example, due to degradation of a desired step-shaped excursion of the chrominance component, is sharpened to more closely approximate the original or desired step-shaped configuration. The resulting chrominance component has a frequency response characteristic comparable to one transmitted with a significantly wider bandwidth. Of equal significance is the fact that the chrominance and luminance images are brought into closer registration in the reproduced picture.

In addition to improving television reproduction in a television receiver, the above technique according to the invention can also be employed in a video tape recorder (VTR) to permit reallocation of bandwidths for the luminance and chrominance components of the recorded color video signal. For example, the recorded chrominance bandwidth may be reduced below the NTSC standard and the bandwidth of the recorded luminance component may remain the same or be proportionately increased. Upon reproduction, the present invention can be employed for sharpening the chrominance component by the even wider luminance bandwidth so that the chrominance component quality or frequency characteristic is brought back to, or above that which would be achieved by the original chrominance bandwidth.

The above, and other objects, features and advantages of the present invention, will become clear from the following description of preferred embodiments when read in connection with the accompanying drawings.

DETAILED DESCRIPTION OF THE PREFERRED EMBODIMENTS

Figures 1A, 1B:
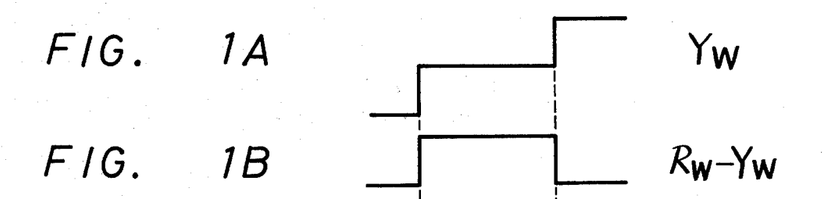
FIGS. 1A to 1E show waveforms illustrating the cause of faulty registration between a narrow bandwidth chrominance component and a wide bandwidth luminance component of a color television signal.
Figure 1C:
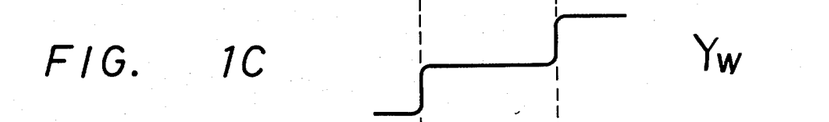
Figures 1D, 1E:
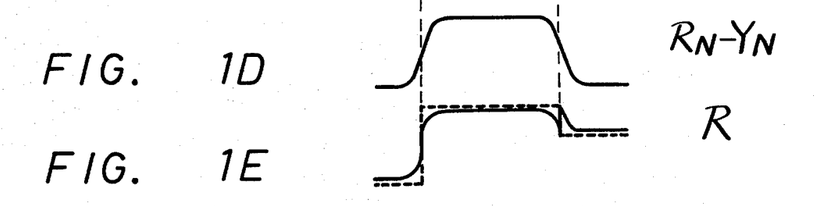

The manner in which the frequency characteristic of a color television signal is degraded due to limitations in the bandwidths of the chrominance and luminance components will first be described with reference to FIGS. 1A–1E. The luminance component signal $Y_W$ (FIG. 1) and red color-difference signal $R_W-Y_W$ (FIG. 2) ideally generated in a camera to represent a scan across a region of primary red color are shown to have sharp, step-shaped configurations. For perfect television reproduction, the step-shaped waveforms of FIGS. 1A and 1B should be transmitted and demodulated in the television receiver. However, due to necessary limitation of the frequency bandwidth of the transmitted luminance signal, the step-shaped configuration of FIG. 1A is slightly degraded to the signal of $Y_W$ of FIG. 1C in which the sharp transitions are rounded. In addition, the step-shaped configuration of the color-difference signal $R_W-Y_W$ of FIG. 1B is degraded in transmission and reproduction to the color-difference signal $R_N-Y_N$ shown on FIG. 1D. The difference between the rise times and fall times of the signals in FIGS. 1C and 1D is due to the fact that, in a color television signal according to the NTSC standard, the luminance component has a bandwidth of about 4 MHz whereas each color difference signal in the chrominance component has a bandwidth of only 1.5 MHz. When the red color signal R is extracted from the color-difference and luminance signals by adding the signal of FIG. 1C to the signal of FIG. 1D, the result is shown in solid lines on FIG. 1E. It will be noted that the leading and trailing edges of such red color signal R are significantly displaced from the ideal reproduced red color signal shown in dashed lines on FIG. 1E.

Figure 2:
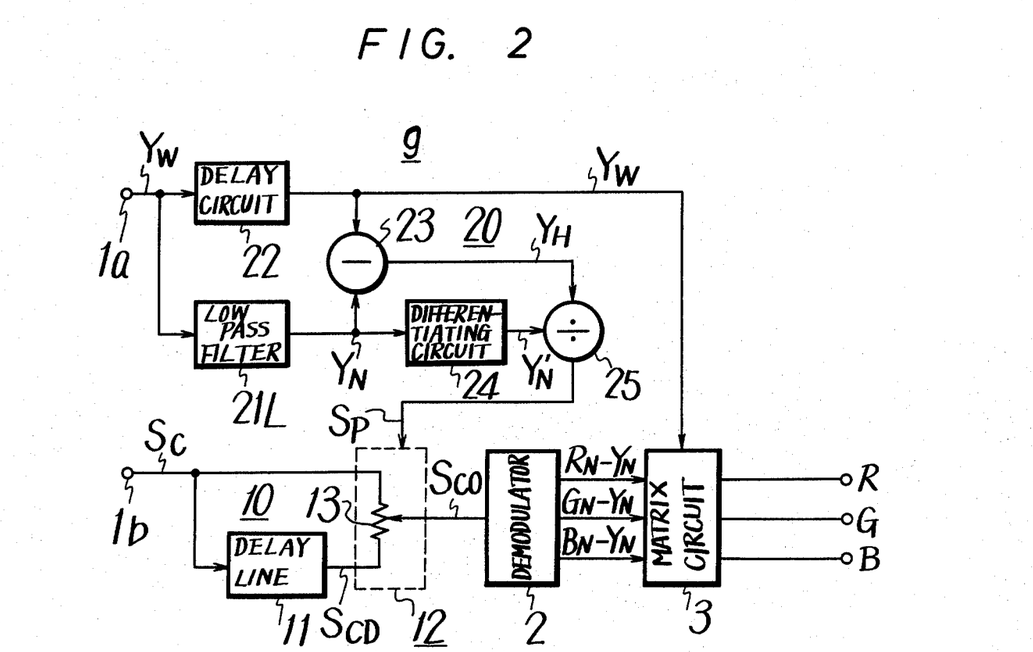
FIG. 2 shows a simplified block diagram of a circuit according to one embodiment of the present invention.

Turning now to FIG. 2, there is shown generally at 9 a block diagram of the present invention. The narrow band chrominance signal $S_C$ is connected to a delay controller 10. The chrominance signal $S_C$ is connected directly to one input of a delay mixer 12 and to the input of a fixed delay 11 having a delay time of $\tau$. The delay signal $S_{CD}$ delayed by a period $\tau$ is connected to the second input of delay mixer 12.

The delay time $\tau$ of fixed delay 11 is selected to be an integral number of times the period of the 3.58 MHz color subcarrier signal. Thus the delay time satisfies the following equation:

$$\tau = n \times 1/3.58 \text{ MHz} \qquad (1)$$

where: n is an integer.

It is preferred that the delay time $\tau$ not shift the chrominance signal so far that there arises significant errors. Consequently, delay time $\tau$ is selected to be from about 0.5 to about 1.0 microseconds. Thus, n is preferably selected to be between 2 and 4 which yields delay time of from 0.559 to 1.117 microseconds. By selecting delay time $\tau$ to be an integral number of periods of the color subcarrier signal, combining the direct and delayed chrominance signals in the delay mixer does not deleteriously effect the phase characteristics of the signal delivered to subsequent circuits.

A control signal generator 20 receives the luminance signal $Y_W$ at one input and generates a control signal $S_P$ at one of its outputs. The luminance signal $Y_W$ is connected to fixed delay 22 having a delay of $\Delta$ and to low pass filter 21L. The delay time $\Delta$ of fixed delay 22 is preferably equal to the delay time $\tau$ of fixed delay 11. Low pass filter 21L passes a narrow frequency band $Y_N$ having approximately the same bandwidth as the chrominance signal $S_C$. As previously discussed, the luminance and chrominance signals have a high degree of correlation. Consequently, the narrow frequency portion $Y_N$ of the luminance signal should also have a high degree of correlation with the chrominance signal.

The delayed luminance signal $Y_{WD}$ is connected to the additive input of a subtractor 23 and the narrow frequency portion of the chrominance signal $Y_N$ is connected to the subtractive input of subtractor 23. Subtractor 23 produces a signal $Y_H$ which is equal to the chrominance signal $Y_{WD}$ less the low frequency portion of the chrominance signal $Y_N$. The high frequency chrominance signal $Y_H$ is connected to one input of a divider 25. The low frequency portion $Y_N$ is also connected to differentiator 24. Differentiator 24 produces a signal $Y'_N$ which is equal to the time derivative of the high frequency portion $Y_H$. The differentiated signal $Y'_N$ is connected to a second input of divider 25. Divider 25 divides the high frequency portion $Y_H$ by the time derivative $Y'_N$ of the low frequency portion $Y_N$ and produces a control signal $S_P$ which is connected to delay mixer 12. Delay mixer 12 applies more or less of the delayed chrominance signal $S_{CD}$ to the corrected chrominance output $S_{CO}$ depending on whether the low frequency portion $Y_N$ of the chrominance signal is leading or lagging respectively the signal in the high frequency portion $Y_H$.

The corrected chrominance output $S_{CO}$ is connected to a color demodulator 2 which produces the three color difference signals $R_N-Y_N$, $G_N-Y_N$ and $B_N-Y_N$. The color difference signals are combined in a decoder matrix 3 with the delayed luminance signal $Y_{WD}$ to produce the three color outputs red, green and blue.

Figure 3A:
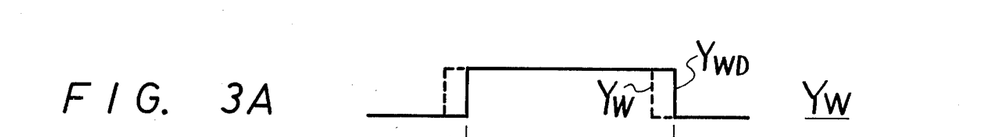
FIGS. 3A to 3F show waveform diagrams of signals to which reference will be made in explaining the operation of the circuit shown in FIG. 2.
Figure 3B:
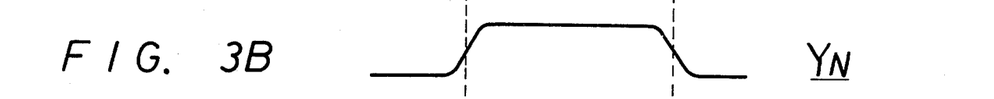
Figure 3C:
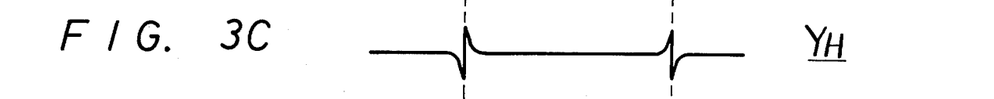

Turning now to FIGS. 3A–3F, FIG. 3A shows in dashed line the original position of a luminance step function $Y_W$ and in solid line the delayed luminance signal $Y_{WD}$ which has been delayed a period $\Delta$. FIG. 3B shows the low frequency portion $Y_N$ of the luminance signal $Y_W$. Note that the approximate mid-points of the sloping leading and trailing edges of $Y_N$ are intersected in time by the sharp leading and trailing edges of $Y_{WD}$. FIG. 3C shows the high frequency portion $Y_H$ of the delayed luminance signal $Y_{WD}$ obtained by subtracting the low frequency portion $Y_N$ from the delayed luminance signal $Y_{WD}$ in subtractor 23.

Figure 3D:
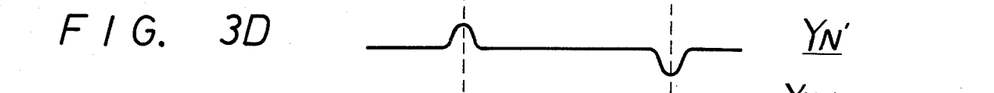
Figure 3E:
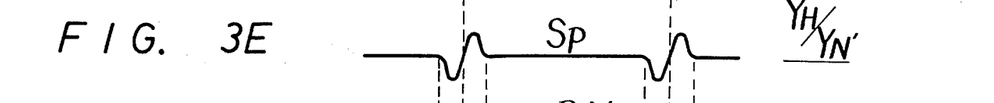
Figure 3F:
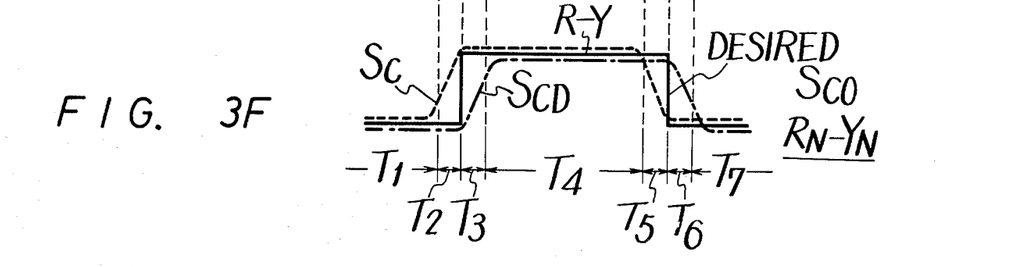
Figure 4:
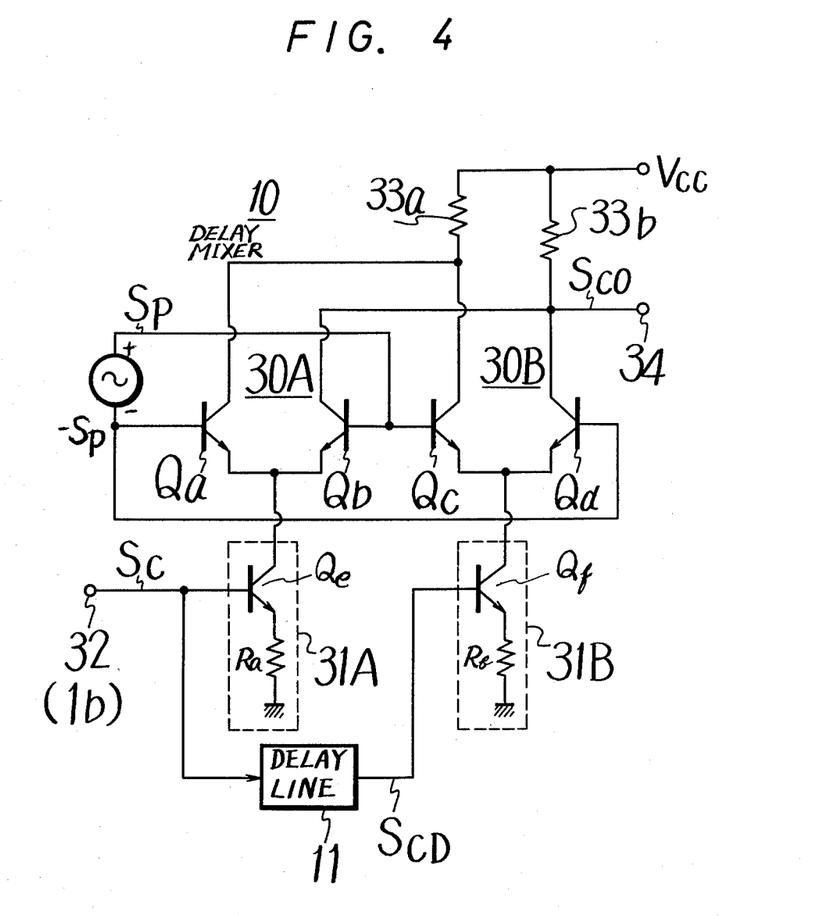
FIG. 4 shows a schematic diagram of the delay controller employed in FIG. 2.

The time derivative $Y'_N$ of the low frequency portion $Y_N$ is shown in FIG. 3D. The quotient obtained by dividing $Y_H$ by $Y'_N$ is shown in FIG. 3E. This quotient is the control signal $S_P$ connected to delay mixer 12.

Delay mixer 12 has the characteristic that, when control signal $S_P$ is zero, the corrected chrominance output $S_{CO}$ has a delay intermediate between the undelayed chrominance signal $S_C$ and the delayed chrominance signal $S_{CD}$. When the control signal $S_P$ is negative, delay mixer 12 applies more delay and when control signal $S_P$ is positive, it applies less delay. Thus, the initial rising portion of the signal in FIG. 3F indicated is delayed by including more of delayed signal $S_{CD}$ and less of signal $S_C$ to align it with the steeply rising desired shape. The later rising portion experiences increasingly reduced delay to align that portion with the desired signal by increasing $S_C$ and reducing $S_{CD}$. Thus, the corrected chrominance output $S_{CO}$ is forced to assume the sharply rising signal characteristic aligned with delayed luminance signal $Y_{WD}$ shown in FIG. 3A. The trailing edge of the corrected chrominance output $S_{CO}$ is also forced to follow the desired steeply falling signal by selective increase and decrease in the delay applied to the corrected chrominance output $S_{CO}$. When the color difference signal $R_N$-$Y_N$, for example, is demodulated in demodulator 2, its waveshape and timing are both very closely aligned with the delayed luminance signal $Y_{WD}$ which is applied to the matrix 3 to result in the red color signal. Consequently, the degradation in color due to the narrowness of the transmitted chrominance bandwidth is substantially reduced.

Figure 2A:
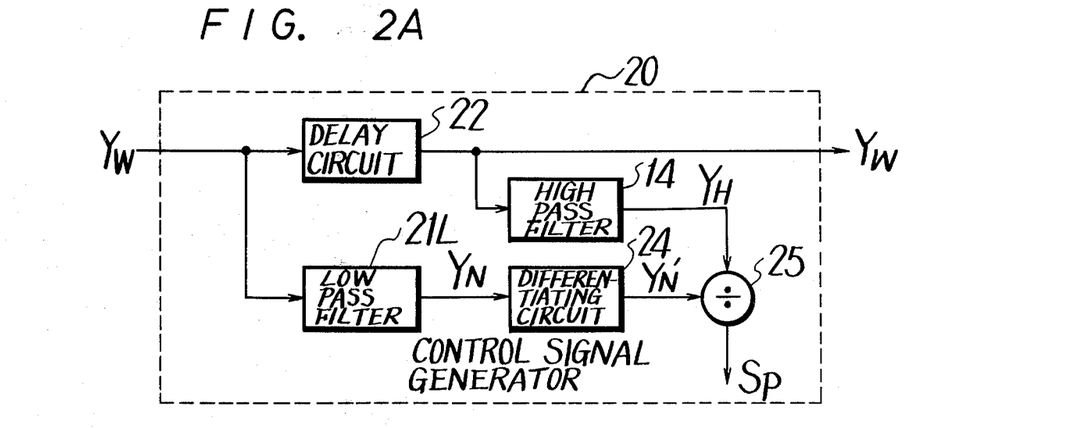
FIG. 2A shows a second embodiment of a control signal generator.

Referring now to FIG. 2A, there is shown a second embodiment of the control signal generator 20. In this embodiment, the high frequency portion $Y_H$ is produced by high pass filter 14 which has a low frequency cut-off approximately equal to the high frequency cut-off of low pass filter 21L. The function of the remainder of the control signal generator 20 remains the same as the circuit shown in FIG. 2.

Figure 5:
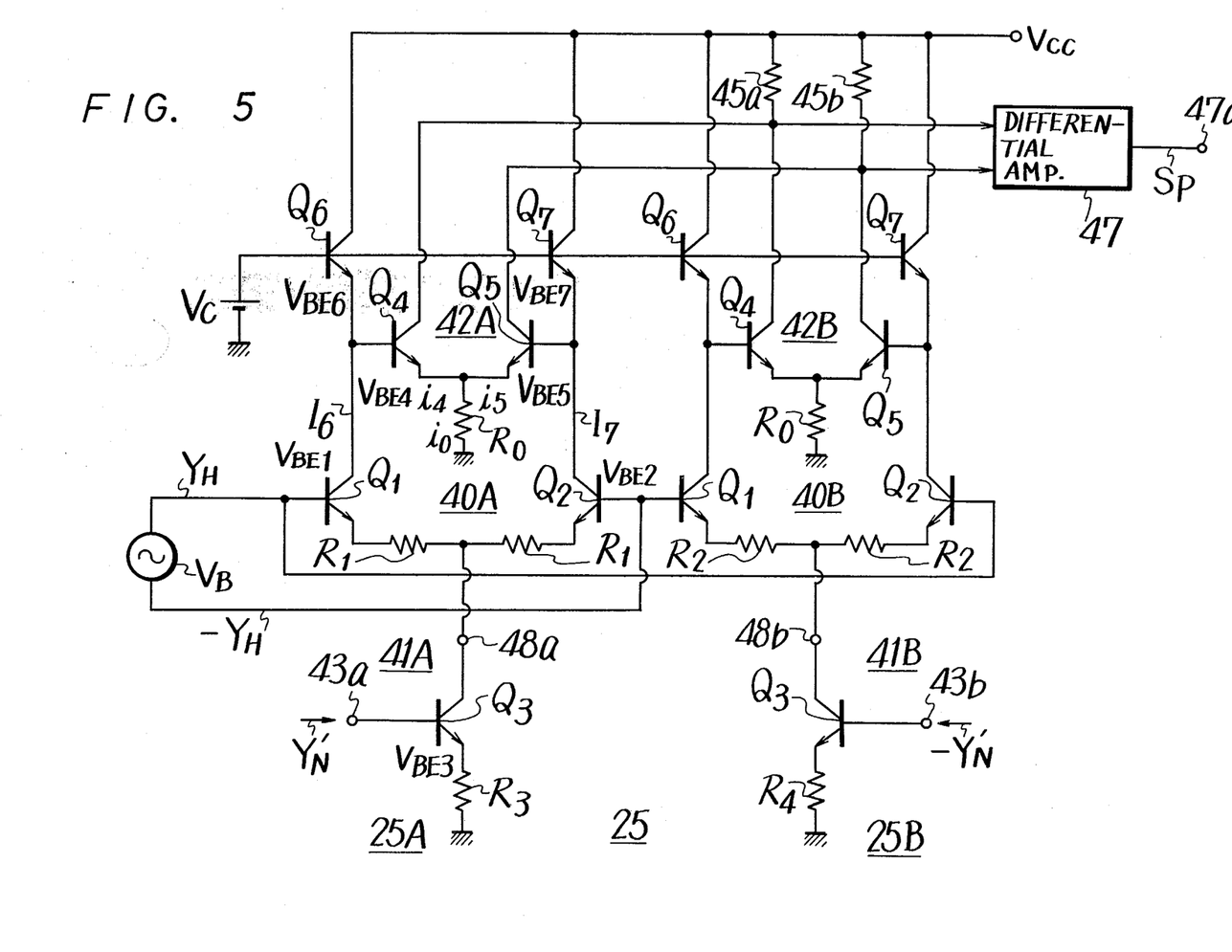
FIG. 5 shows a detailed schematic diagram of a divider circuit.

Turning to FIG. 5, an embodiment of the divider 25 is described. In FIG. 5, there are provided a first divider circuit 25A which is used when the divisor is positive and a second divider circuit 25B which is used when the divisor is negative. Since both the divider circuits 25A and 25B are identical, only the first divider circuit 25A is described.

The first divider circuit 25A includes a first differential amplifier circuit made up of differential transistors $Q_1$ and $Q_2$ and a second differential amplifier circuit made up of transistors $Q_4$ and $Q_5$.

The emitters of the transistors $Q_1$ and $Q_2$ are connected together through identical resistors $R_1$ to a current control circuit 41a illustrated as transistor $Q_3$ and a resistor $R_3$ which forms a current source for the two differential amplifiers. Transistor $Q_3$ is supplied with the divisor $Y_N$, which is the positive differentiated output of differentiator 24 (FIG. 2), through terminal 43a. First differential amplifier transistors $Q_1$ and $Q_2$ are supplied with a dividend which is the direct and inverted high frequency portions $Y_H$ and $-Y_H$ of luminance signal $Y_W$. Inversion of the signal $Y_H$ to yield the signal $-Y_H$ is performed in circuits well known in the art and thus not described.

The bases of second differential amplifier transistors $Q_4$ and $Q_5$ are respectively connected to the collectors of the transistors $Q_1$ and $Q_2$. The emitters of second differential amplifier transistors $Q_4$ and $Q_5$ are connected together to ground through a resistor $R_O$. Identical load resistors 45a and 45b are connected from the collectors of the transistors $Q_4$ and $Q_5$ to the power source $V_{CC}$ respectively. The signals developed across load resistors 45a and 45b are fed to the two inputs a third differential amplifier circuit 47. Third differential amplifier 47 removes common voltages which occur on its two inputs as will be explained. The output 47a of third differential amplifier 47 is the control signal $S_P$.

Transistors $Q_6$ and $Q_7$ are collector loads for transistors $Q_1$ and $Q_2$ and are connected to the bases of transistors $Q_4$ and $Q_5$ respectively. The relationship of resistors $R_1$, $R_2$, $R_3$ and $R_4$ (resistors $R_2$ and $R_4$, located the second divider circuit member 25B correspond, to resistors $R_1$ and $R_3$ in the first divider circuit 25A respectively) are selected such that $R_1/R_3 = R_2/R_4$.

In the following description of operation of divider circuit 25A, it is assumed that the high frequency band luminance signal $Y_H$ which will become the dividend is constant, and that the base-emitter voltages and emitter currents of the respective transistors $Q_1$ to $Q_7$ are identified as shown in FIG. 5.

If it is assumed that the emitter current of a transistor is taken as $i_E$ and the base-emitter voltage thereof is taken as $V_{BE}$, the base-emitter voltage-current characteristic of the transistor is expressed by the following well known equation:

$$i_E = i_S \left\{ \exp \frac{(q \cdot V_{BE})}{K \cdot T} - 1 \right\} \approx i_S \cdot \exp \frac{(q \cdot V_{BE})}{K \cdot T} \qquad (2)$$

When the currents and voltages are selected as shown in FIG. 5, the relations between the emitter currents $i_4$, $i_5$ and $i_6$, $i_7$ can be respectively expressed by using equation (2) as follows:

$$i_4/i_5 = \exp\{q/K \cdot T(V_{BE4} - V_{BE5})\} \qquad (3)$$

$$i_6/i_7 = \exp\{q/K \cdot T(V_{BE6} - V_{BE7})\} \qquad (4)$$

From equations (3) and (4), the following equation is derived:

$$i_4/i_5 = i_7/i_6 \qquad (5)$$

The above equation (5) can be transformed as follows:

$$(i_4/i_4 + i_5) = (i_7/i_6 + i_7) \qquad (6)$$

The voltage applied to the transistor $Q_3$ is $Y'_N$. The emitter currents $i_6$ and $i_7$ are expressed as follows:

$$i_6 + i_7 = (Y'_N - V_{BE3}/R_3) \approx Y'_N/R_3 \qquad (7)$$

The voltage of the signal applied to the transistors $Q_1$ and $Q_2$ is $Y_H$, so that the collector currents $i_6$ and $i_7$ of transistors $Q_1$ and $Q_7$ are expressed by the following equations (8) and (9), respectively.

$$i_6 = \tfrac{1}{2} \cdot Y'_N/R_3 + Y_H/2R_1 \qquad (8)$$

$$i_7 = \tfrac{1}{2} \cdot Y'_N/R_3 - Y_H/2R_1 \qquad (9)$$

From equation (6), the emitter current $i_4$ of transistor $Q_4$ is expressed as follows:

$$i_4/i_0 = (i_7/i_6 + i_7) = \tfrac{1}{2} - R_3/2R_1 \cdot Y_H/Y'_N \qquad (10)$$

Further, if the base voltage of the transistors $Q_6$ and $Q_7$ is taken as $V_C$, the current $i_0$ flowing through resistor $R_0$ is expressed as follows:

$$i_0 = V_C - 2V_{BE}/R_0 \approx V_C/R_0 \qquad (11)$$

Therefore, equation (10) can be expressed as follows:

$$i_4 = \tfrac{1}{2} \left( \frac{V_C}{R_0} - \frac{R_3}{R_1 \cdot R_0} \cdot \frac{Y_H \cdot V_C}{Y'_N} \right) \qquad (12)$$

$$i_5 = \tfrac{1}{2} \left( \frac{V_C}{R_0} - \frac{R_3}{R_1 \cdot R_0} \cdot \frac{Y_H \cdot V_C}{Y'_N} \right) \qquad (13)$$

If the emitter currents $i_4$ and $i_5$ thus obtained are applied to the third differential amplifier 47 shown in FIG. 5, the term $V_C/R$ which is common to both inputs in the above equations is cancelled. As a result, an output current proportional to the term $Y_H/Y'_N$ is obtained at output terminal 47a. This signal is the desired control signal $S_P$.

When voltage $Y'_N$ is zero ($Y'_N=0$), the currents $i_6$ and $i_7$ do not flow. Thus, the control signal $S_P$ is zero. When the voltage $Y_H$ is positive and constant ($Y_H>0$), control signal $S_P$ is varied by the voltage $Y'_N$ as indicated by a curve $l_1$ in the graph of FIG. 6. When $Y_N<0$, current control circuit 41B begins to operate and current control circuit 41A is cut off. Thus second divider circuit 25B performs the division controlled by inverted signal $-Y'_N$ which is positive under the condition specified. The control signal $S_P$ becomes negative as indicated in the left half of the curve $l_1$ in the graph of FIG. 6.

Figure 6:
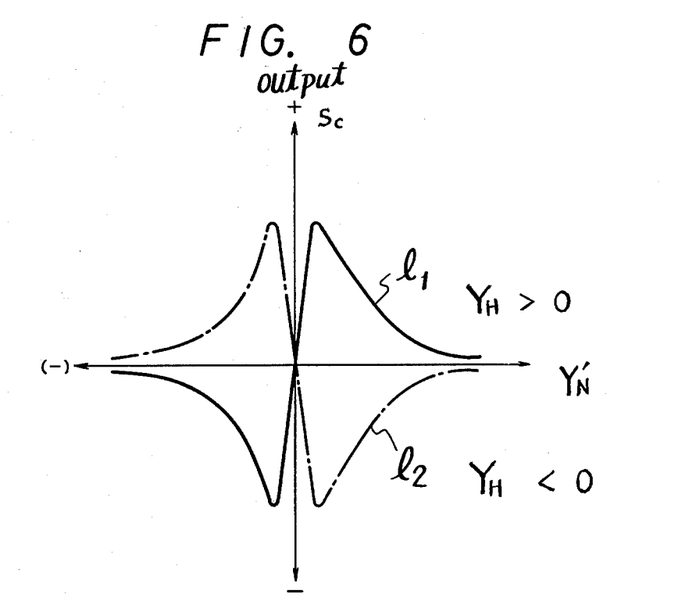
FIG. 6 shows an expanded waveform diagram of the correction signal generated by the control signal generator.

In the case of $Y_H<0$, the control signal $S_P$ is opposite to that in the above case as shown in curve $l_2$ of FIG. 6.

According to the preceding, divider 25 is capable of producing a control signal $S_P$ even when the divisor approaches zero, without being saturated. Further, even in the case where the voltages $Y_H$ and $Y'_N$ are both changing, the control signal $S_P$ can still be obtained.

Figure 7:
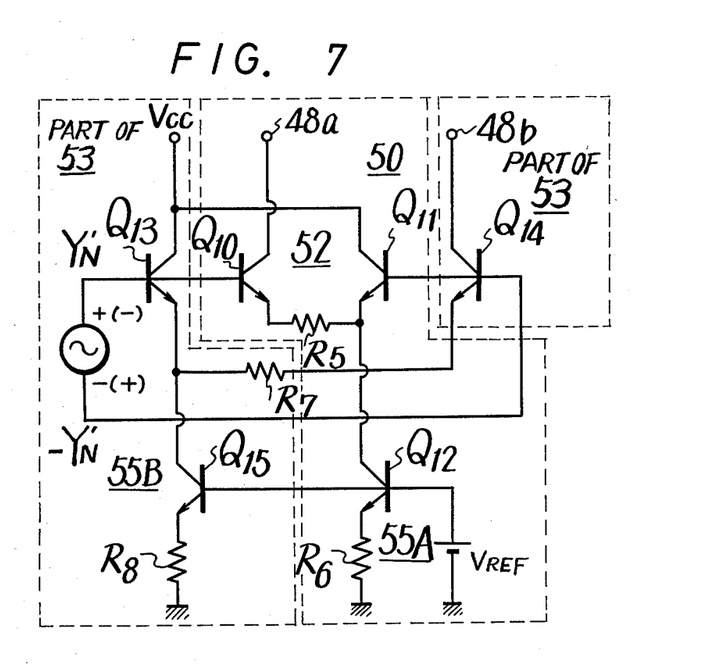
FIG. 7 shows a schematic diagram of a practical embodiment of current control circuits employed in the divider circuits of FIG. 5.

A practical embodiment of the current control circuits 41A and 41B, shown in FIG. 5 as simple transistors with emitter resistors, is shown in FIG. 7. Since the two current control circuits are identical, only current control circuit 41A is described in detail.

Transistors $Q_{10}$ and $Q_{11}$ form a differential amplifier circuit whose emitters are connected together through a resistor $R_5$. The emitter of the transistor $Q_{11}$ is connected directly to a constant current source formed by transistor $Q_{12}$ and a resistor $R_6$. A reference voltage source $V_{REF}$ is connected to the base of transistor $Q_{12}$. The collector of the transistor $Q_{10}$ is connected through terminal 48a to the junction of resistors R1/R1 (shown in FIG. 5).

The bases of the transistors $Q_{13}$ and $Q_{10}$ are connected together and to the direct differentiated signal $Y'_N$. The bases of transistors $Q_{11}$ and $Q_{14}$ are connected together and to the inverted differentiated signal $-Y'_N$. The collectors of the transistors $Q_{13}$ and $Q_{11}$ are connected directly to power source $V_{CC}$. In this example, resistors $R_5$ and $R_7$ are selected to be equal in resistance but could be different with appropriate adjustment of values elsewhere in the circuit.

Operation of the current control circuits 41A and 41B are described in the following. Since resistors $R_5$ and $R_7$ are connected to the emitters of the transistors $Q_{10}$ and $Q_{14}$, respectively, the emitter currents of the transistors $Q_{10}$ and $Q_{11}$ and $Q_{13}$ and $Q_{14}$ are unbalanced. Thus, with no signal, there is almost no emitter current in the transistors $Q_{10}$ and $Q_{14}$. There is substantial emitter current in transistors $Q_{11}$ and $Q_{13}$. Therefore, if direct signal $Y'_N$ is positive and is applied to make the bases of the transistors $Q_{13}$ and $Q_{10}$ positive, no change takes place in $Q_{14}$ but the positive signal $Y'_N$ increases the base and collector currents of transistor $Q_{10}$. Thus, current control circuit 41A performs the function of a variable current source responsive to positive values of $Y'_N$.

When the input signal $Y'_N$ is negative, current control circuit 41B performs the function of a variable current source whereas current control circuit 41A remains cut off. Thus circuits 41A and 41B shown in FIG. 7 permit controlling the current on both positive and negative input signals $Y'_N$ without the need for mechanical switching.

Referring now to FIG. 2A, a practical example of delay controller 10 is described. Delay mixer 12 contains first 30A and second 30B differential amplifiers made up of transistors Qa, Qb, and Qc, Qd and variable current sources 31A and 31B. Since the differential amplifiers and their associated variable current sources are identical, only differential amplifier 30A and variable current source 31A are described in detail.

Variable current source 31A is represented by transistor Qe and resistor Ra in series to ground with the commonly connected emitters of differential amplifier transistors Qa and Qb. The direct control signal $S_P$ is connected to the base of Qb and the inverted control signal $-S_P$ is connected to the base of Qa. The base of variable current source transistor Qe is supplied with the undelayed chrominance signal $S_C$.

When control signal $S_P$ is zero, the two differential amplifiers are balanced. Consequently, the gain of the delay mixer 12 for the direct chrominance signal $S_C$ and the delayed chrominance signal $S_{CD}$ is equal. Therefore, the corrected chrominance output $S_{CO}$ is approximately an equal mixture of direct and delayed components. When control signal $S_P$ is positive, the gain of differential amplifier 30A is increased while the gain of differential amplifier 30B is decreased. Consequently, the corrected chrominance output $S_{CO}$ contains more of the direct chrominance signal $S_C$ than it does of the delayed chrominance signal $S_{CD}$. When the control signal $S_P$ is negative, the opposite result occurs.

Through the operation of delay mixer 12, the corrected chrominance output $S_{CO}$ contains more or less of the direct and delayed components, $S_C$ and $S_{CD}$ respectively of the chrominance signal according to the amplitude and polarity of the control signal $S_P$. As previously explained, this control of delay is in a direction to align the corrected chrominance output $S_{CO}$ with the delayed luminance signal $Y_{WD}$ (see FIG. 2).

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A circuit for improving the frequency characteristic of the chrominance component of a color television signal which has chrominance and luminance components with the bandwidth of said luminance component being substantially greater than the bandwidth of said chrominance component so that the high frequency characteristic of the chrominance component is relatively degraded, comprising:
   generating means for generating a control signal which varies in response to a difference in characteristics of two frequency regions of said luminance component; and
   means for selectively advancing and retarding the phase of said chrominance component relative to the phase of said luminance component, in response to said control signal.

2. The circuit according to claim 1; wherein said generating means includes separating means for separating low and high frequency portions of said luminance component, a differentiator operative to generate the time derivative of said low frequency portion, and divider means for dividing said high frequency portion by said time derivative with the resulting quotient being said control signal.

3. The circuit according to claim 2; wherein said separating means includes a low pass filter operative to pass said low frequency portion, and a subtractor for subtracting said low frequency portion from said luminance component so as to provide said high frequency portion as the output from said subtractor.

4. The circuit according to claim 2; wherein said separating means includes a low pass filter operative to pass said low frequency portion, and a high pass filter operative to pass said high frequency portion.

5. The circuit according to claim 1; wherein said means for advancing and retarding the chrominance component includes first fixed delay means to which the luminance component is applied, and variable delay means including second fixed delay means having a fixed delay time and providing a delayed chrominance component, and mixer means operative to selectively mix said delayed chrominance component with the undelayed chrominance component in a proportion corresponding to said control signal, thereby providing a variably delayed chrominance component.

6. The circuit according to claim 5; wherein said chrominance component is modulated on a subcarrier having a predetermined period, and said fixed delay time is a whole multiple of said period of the subcarrier.

7. The circuit according to claim 6; wherein said fixed delay time is approximately 0.5 to 1.0 microseconds.

8. A circuit for improving the frequency characteristic of a color television signal which has chrominance and luminance components with the bandwidth of said luminance component being substantially greater than the bandwidth of said chrominance component so that the high frequency characteristic of the chrominance component is relatively degraded, comprising:

first fixed delay means for delaying said luminance component for a predetermined first delay time;

means for separating a low frequency portion from said luminance component;

means for separating a high frequency portion from the delayed luminance component;

a differentiator operative to produce the time derivative of said low frequency portion;

divider means for dividing said high frequency portion by said time derivative with the resulting quotient of the division being a control signal;

second fixed delay means having a predetermined second delay time and to which said chrominance component is applied for providing a delayed chrominance component; and a delay mixer responsive to said control signal to mix said chrominance component and the delayed chrominance component in a proportion which corresponds to said control signal.

9. The circuit according to claim 8; in which said chrominance component is modulated on a subcarrier having a predetermined period, and said second delay time is a whole multiple of said period of the subcarrier, which multiple is selected to make said second delay time approximately 0.5 to 1.0 microseconds.

10. The circuit according to claim 8; in which said first delay time is approximately equal to said second delay time.

* * * * *